US006955324B2

(12) United States Patent
Tanielian (10) Patent No.: US 6,955,324 B2
(45) Date of Patent: Oct. 18, 2005

(54) LASER-TETHERED VEHICLE (75) Inventor: Minas H. Tanielian, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/691,724

(22) Filed: Oct. 22, 2003

(65) Prior Publication Data

US 2005/0103943 A1    May 19, 2005

(51) Int. Cl.⁷ ............................................... F41G 7/00
(52) U.S. Cl. ................ 244/3.13; 398/106; 356/139.03; 356/139.06
(58) Field of Search .............................. 244/3.13, 3.14, 244/3.16; 398/106; 356/139.03, 139.06

(56) References Cited

U.S. PATENT DOCUMENTS

| | | | | |
|---|---|---|---|---|
| 3,912,197 A | * | 10/1975 | McKown et al. | 244/3.13 |
| 4,153,224 A | * | 5/1979 | Rampolla et al. | 244/3.16 |
| 4,406,430 A | * | 9/1983 | Krammer et al. | 244/3.13 |
| 4,891,029 A | * | 1/1990 | Hutchinson | 446/58 |
| 5,052,635 A | * | 10/1991 | Paulet et al. | 244/3.11 |
| 5,374,009 A | * | 12/1994 | Miller et al. | 244/3.13 |
| 5,503,350 A | * | 4/1996 | Foote | 244/1 R |
| 5,604,595 A | | 2/1997 | Schoen | |
| 5,698,842 A | * | 12/1997 | Fallon et al. | 250/203.4 |
| 6,377,436 B1 | | 4/2002 | Margolin | |
| 6,694,228 B2 | * | 2/2004 | Rios | 701/2 |
| 2003/0006048 A1 | * | 1/2003 | Marriott et al. | 172/4.5 |
| 2003/0102403 A1 | * | 6/2003 | Jones et al. | 244/3.13 |
| 2003/0127558 A1 | * | 7/2003 | Heizmann-Bartels | 244/3.16 |
| 2004/0119020 A1 | * | 6/2004 | Bodkin | 250/353 |

* cited by examiner

Primary Examiner—J. Woodrow Eldred
(74) Attorney, Agent, or Firm—Black Lowe & Graham, PLLC (57) ABSTRACT

The present invention provides a position control system for a remote-controlled vehicle, a vehicle operated by the control system, and a method for operating a remote-controlled vehicle. An electromagnetic energy receiver is configured to receive an electromagnetic beam. The electromagnetic energy receiver is further configured to determine a position of the remote-controlled vehicle relative to a position of the electromagnetic beam. The vehicle is directed to maneuver to track the position of the electromagnetic beam.

75 Claims, 9 Drawing Sheets

LASER-TETHERED VEHICLE

RELATED APPLICATION

This patent application is related to concurrently-filed patent application entitled "VIRTUALLY ATTACHED NODE,", which is incorporated by reference.

FIELD OF THE INVENTION

This invention relates generally to unmanned craft and, more specifically, to remotely controlled vehicles.

BACKGROUND OF THE INVENTION

Remote-controlled vehicles, particularly Unmanned Air Vehicles (UAVs), have been in use for years for many different applications. At a simple end, hobbyists steer remote-controlled cars or boats or fly remote-controlled airplanes for entertainment. At a sophisticated end, military and intelligence agencies fly UAVs to conduct surveillance in hostile territories. UAVs are equipped with cameras, microphones, and other sensors to gather intelligence. These sophisticated, complex UAVs are controlled from remote stations.

Control of such devices can be a complex problem. Even high-end hobbyist UAVs have control panels that cannot be practically hand held because of the many levers, dials, switches, and other control devices the operator uses to direct such a device. Moreover, transmitting the control information from the many control devices, receiving and decoding the instructions at the remote device, and executing the instructions represent involved data communication problems.

In addition, a limitation particularly limiting UAVs is that, like manned aircraft, a UAV has to have the capacity to carry enough fuel or power to complete its mission. The longer the mission, the more fuel or power that must be carried, and, the larger the UAV must be to carry its own source of power. Furthermore, hovering tends to consume substantially more power than forward flight. Thus, UAVs commonly use fixed-wing, forward flight designs.

For example, the Pointer by AeroVironment is a fixed-wing UAV. The Pointer has a length of 6 feet with a wingspan of 9 feet. The Pointer weighs 8 pounds with a payload of 2 pounds and a battery weighing 2.2 pounds. It is hand-launched by being thrown into the air. The Pointer has a flight duration of 1.5 hours with a range of 5 miles.

However, forward-flight is not an optimal flight mode for all purposes. For example, forward-flight is not an optimal flight mode for surveillance. A forward-flying platform moves over and may move past targets of interest. While a forward-flying platform can circle a target of interest, gathering information about the target may be complicated by moving a camera lens or other directional sensor to focus on the target. As a result, a hovering platform presents a more desirable point from which to observe a target of interest. Forward-flight also is not optimal for a platform to be used for relaying or redirecting signals. For these purposes it would be advantageous to have a hovering platform suspended over a stationary ground point to redirect and relay signals for which a line-of-sight transmission is desirable but not possible. Such a hovering platform would enable communications or other electromagnetic transmission to be broadcast over buildings or other barriers that ordinarily would block such transmissions.

Hovering vehicles generally consume more power than forward-flying vehicles. To try to develop a more efficient hovering vehicle, micro air vehicles (MAVs) have been created using flapping wing technologies to create lift. The existence of insects and small flying animals suggests that flapping wing technologies can be an efficient way to create lift. For one example, a collaboration between Caltech and UCLA has developed an MAV called the MicroBat. The MicroBat recently broke the world record in flapping wing flight of an MAV with a flight lasting only 6 minutes and 17 seconds. The MicroBat carries a polymer lithium ion battery as its power source and carries a radio transceiver. The total weight of the MicroBat is only 12 grams. However, in flapping wing flight, aerodynamic flow properties are complex and difficult to manage. Thus, just as land-based vehicles tend not to be based on walking movements of bipeds or quadrupeds but on simpler-to-manage rotating motivators such as wheels, it would be simpler to effect hovering using a rotary wing design such as a helicopter. Unfortunately, an efficient way to sustain hovering flight for very long intervals has proven elusive.

Thus, there is an unmet need in the art for facilitating sustained, hovering flight and thereby allowing for simpler and more efficient ways to perform aerial surveillance of a target of interest or to redirect and relay electromagnetic signals from a transmission site to a receiver or other target.

SUMMARY OF THE INVENTION

The present invention provides a system and method for operating a remote-controlled vehicle and a remote-controlled vehicle operated according to the system and method. A preferred embodiment of the present invention includes an unmanned vehicle (UAV) configured to be directable to a point of interest and hover over the point of interest. In contrast with known hovering vehicles that include relatively complex control schemes to maintain the vehicle in a desired position, embodiments of the present invention are guided and powered by an electromagnetic beam generated from a ground source or an aircraft. Using electromagnetic sensors on the vehicle to monitor the position of the electromagnetic beam, the vehicle tracks the position of the electromagnetic beam. Thus, by controlling the position of the electromagnetic beam, the position of the airborne vehicle can be controlled, thereby allowing for surveillance of a desired location or a signal relay point to be positioned at a desired point in space. Other embodiments of the present invention also convert the received electromagnetic energy beam into electrical power for providing at least a portion of the power used in operating the vehicle.

More particularly, embodiments of the present invention provide a position control system for a remote-controlled vehicle. An electromagnetic energy receiver is configured to receive an electromagnetic beam. The electromagnetic energy receiver is further configured to determine a position of the remote-controlled vehicle relative to a position of the electromagnetic beam. The vehicle is directed to maneuver to track the position of the electromagnetic beam.

In accordance with other aspects of the present invention, the electromagnetic energy receiver includes at least one photoelectric cell configured to generate electrical power when subjected to application of electromagnetic energy. The photoelectric cell may include a solar cell. The electromagnetic energy receiver may be configured to receive an externally-applied laser signal.

In accordance with still further aspects of the present invention, the electromagnetic energy receiver includes an electromagnetic receiving array including a plurality of electromagnetic sensors. Each of the electromagnetic sensors is configured to generate a sensor output indicative of an intensity of electromagnetic energy received by the electromagnetic sensor. The vehicle is maneuvered to generally equalize the sensor output of each of the electromagnetic sensors by maneuvering the remote-controlled vehicle such that the electromagnetic beam is received toward a center of the electromagnetic receiving array. The vehicle is further maneuvered relative to the source of the electromagnetic beam such that the remote-controlled vehicle maintains a predetermined distance from the source of the electromagnetic beam. The control system is further configured to receive external commands for adjusting a response to the electromagnetic beam.

Additionally, in accordance with other aspects of the present invention, the remote-controlled vehicle may include an airborne vehicle, including a rotor-lifted vehicle powered by one or more rotors or a lighter-than-air vehicle, a land-based vehicle, a water-based vehicle, or a space-based vehicle.

In accordance with still further embodiments of the present invention, the vehicle may include at least one surveillance device. The surveillance device suitably is configured to capture data from the perspective of the remote-controlled vehicle. The surveillance device also suitably is configured to transmit telemetry to a telemetry station and/or is remotely controllable from a control station. The surveillance device may include at least one of a camera, a microphone, a chemical sensor, a biological sensor, a radiation detector, and an environmental sensor. The vehicle also may include a payload delivery mechanism. The vehicle may have a means to modulate and rebroadcast the received electromagnetic power to relay information back to the source of that power or control station. Alternatively, the vehicle may include an electromagnetic relay device configured to relay an electromagnetic signal from a signal source to a signal destination. The relay device may include an electromagnetic signal such as a communication signal or an energy weapon. The relay device may include a reflector or a relay device such as a microwave relay.

BRIEF DESCRIPTION OF THE DRAWINGS

The preferred and alternative embodiments of the present invention are described in detail below with reference to the following drawings.

DETAILED DESCRIPTION OF THE INVENTION

By way of overview, embodiments of the present invention provide a method for remote powering and a position control system for a remote-controlled vehicle. An electromagnetic energy receiver is configured to receive an electromagnetic beam. The electromagnetic energy receiver is further configured to determine a position of the remote-controlled vehicle relative to a position of the electromagnetic beam. The vehicle is directed to maneuver to track the position of the electromagnetic beam.

Figure 1:
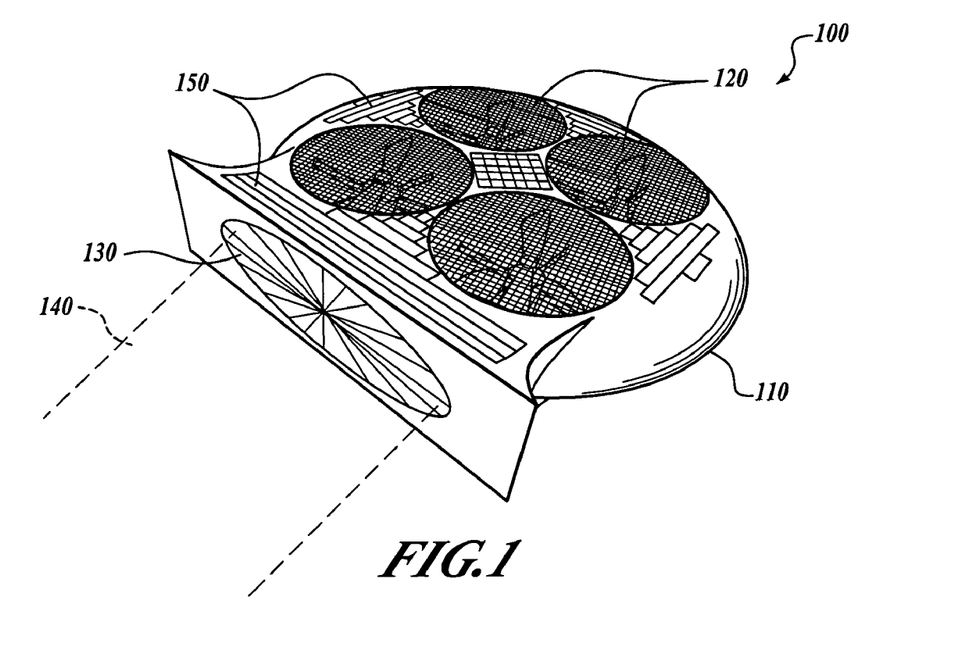
FIG. 1 is a top view of a laser-tethered airborne device according to an embodiment of the present invention.

FIG. 1 is a perspective view of a laser-tethered airborne device 100. The device 100 includes a structure or housing 110 which supports a propulsion system including a plurality of rotors 120. In one presently preferred embodiment, the rotors 120 are disposed to rotate so as to generate thrust in a direction opposed to a gravitational force. One presently preferred embodiment includes a plurality of rotors 120 that are disposed at a distance around a center of gravity of the device 100. The rotors 120 each are individually controlled by a positioning control system (not shown). The speed and resultant thrust generated by each of the rotors 120 can be manipulated to generate a composite thrust having components directed both against the gravitational force and perpendicular to the gravitational force to control the altitude and azimuth of the device 100 relative to a position on the ground. Alternatively, the device 100 could be powered by one or more rotors 120. The one or more rotors are disposed to rotate in a plane and thereby generate thrust. The provided thrust provides lift against the gravitational force and one or more rotors disposed in a perpendicular plane to provide thrust perpendicular to the gravitational force. Further alternatively, gimbaled rotors (not shown) could be used to generate thrust to provide lift against the gravitational force and thrust perpendicular to the gravitational force.

A rotor-powered craft could include a rotor speed optimization system such as that disclosed in U.S. Pat. No. 6,007,298 for an "optimum speed rotor" for improved rotorcraft performance, which is assigned to the assignee of the present invention and incorporated by reference. Use of such a system would allow for optimization of rotor speed in order to provide desired rotor output and reduce unnecessary power consumption.

An electromagnetic energy receiver 130 is disposed on the housing 110 to receive an electromagnetic beam 140. Details of the electromagnetic beam are set forth below. The electromagnetic energy receiver 130 is configured to convert energy contained in the electromagnetic energy beam 140 into electrical power. The converted electrical power provides energy to drive the rotors 120, the positioning control system (not shown), and other on-board systems on the device 100. As a result of the electrical power being provided from a source outside the device 100, the device is operable to maintain controlled flight and support other functions without an on-board power supply such as a battery, a fuel cell, or another power plant that would add size and, more pertinently, add mass and weight to the device 100. As previously described, adding mass to the device 100 is highly undesirable because additional mass dictates additional thrust requirements which, in turn, result in additional equipment mass to generate the additional thrust. In other words, beaming power to the device 100 allows the device 100 to be advantageously small and lightweight to reduce the cross-sectional target presentation, complexity, and cost of the device 100.

The electromagnetic energy receiver 130 and the positioning control receiver are further configured to respond to a projected position of the electromagnetic beam 140. As will be further described below, in one presently preferred embodiment the electromagnetic energy receiver 130 includes a plurality of photocells, such as solar cells, to receive the electromagnetic beam 140 and generate electrical power. In one presently preferred embodiment, the electromagnetic beam receiver 130 includes GaSb and Ge cells. These cells are available with quantum efficiencies as high as around 95%. Other photocells, including InGaAsP or InP photocells also provide suitable power conversion in desirable operating ranges that are described further below.

An electromagnetic beam 140 at a wavelength of 1.064 $\mu$m provides a workable solution, as will be further described below. At this wavelength, a number of solar cell types can be used to collect energy for the device. Of these, two types currently are readily available solar cells widely used in the infrared range. A Ge solar cell is often used as the bottom cell in high efficiency multi-junction solar cells, mainly for space applications. A GaSb solar cell is commonly used in thermo-photovoltaic applications. Although the Ge and GaSb cells are widely available, their energy conversion efficiencies are not particularly high because both have bandgaps that are slightly lower than an optimal level. In general, to get good conversion efficiencies the semiconductor band gap would have to be smaller but close in energy to that of the incident radiation. For example, a bandgap smaller than 1.064 eV is desirable for an energy source having a wavelength of 1.064 $\mu$m. Ge cells have an efficiency of approximately 16% whereas GaSb actually have a slightly higher efficiency of approximately 20% even though Ge cells have a more favorable bandgap. Better conversion efficiencies would be possible at the 1.064 $\mu$m wavelength with the solar cells made of a semiconductor with a bandgap closer to 1.05 eV. Such cells are not commercially available but could be created using a material of composition $In_{0.85}Ga_{0.15}As_{0.4}P_{0.6}$ grown on an InP substrate. Such a cell could provide a total conversion efficiency of up to 43% with a fill factor of 83%.

Also, the use of a plurality of photocells allows the positioning control system (not shown) coupled with the electromagnetic energy receiver 130 to respond to a projected position of the electromagnetic beam 140. More specifically, each of the photocells included in the electromagnetic energy receiver 130 are operable to generate electrical power in proportion to a specific intensity of the electromagnetic beam 140 striking each of the photocells. Accordingly, the positioning control system (not shown) can be programmed to control the propulsion system to balance the power output of the photocells in the electromagnetic energy receiver 130 by a suitable adjustment of the vehicle position.

For example, the positioning control system (not shown) suitably controls the propulsion system to maintain a position of the device 100. The positioning control system (not shown) suitably is programmed to balance a vertical and horizontal attitude such that the power output of the photocells is approximately equal. Similarly, the positioning control system (not shown) suitably is programmed to maintain a composite energy output of the photocells in the electromagnetic energy receiver 130. As a result, the positioning control system (not shown) can maintain the device 100 at a distance and an attitude relative to the received electromagnetic beam 140 such that the electromagnetic beam 140 serves as a virtual tether for the device 100.

According to one exemplary embodiment, the device 100 is equipped with at least one array 150 of photocells, such as solar cells, disposed to receive ambient electromagnetic energy and convert it to auxiliary electrical power to power on-board systems of the device 100. The photocell arrays 150 suitably include Si solar cells coupled with capacitors to provide a backup power source. The auxiliary electrical power provided by the photocell arrays 150 suitably is used to provide additional or backup power for the device. For example, if the device 100 loses contact with the electromagnetic beam 140 for any reason, the positioning control system (not shown) can use the auxiliary electrical power to bring the device to a soft, controlled landing. In one presently preferred embodiment, the positioning control system (not shown) will slowly lower the device 100 to earth and/or drive the device 100 toward the source of the electromagnetic beam 140 to reestablish the power link between the device 100 to its base.

One presently preferred embodiment of the device is a substantially disk-shaped object about 12–14 inches in diameter with the electromagnetic energy receiver 130 on one side. The size of the vehicle is chosen so as to minimize the power utilized for remote powered flight. One presently preferred embodiment includes four electrically-powered brushless DC motors to drive the rotors 120. A four-rotor design is used because it simplifies the control system for the device. By varying the torque applied to the four rotors 120, roll, pitch, yaw, and overall thrust can be controlled. This strategy for control is feasible for a small size craft because the rotor inertia is very low and the control bandwidth is very high. If desired, additional damping suitably is provided by gyroscopic feedback.

Figure 2:
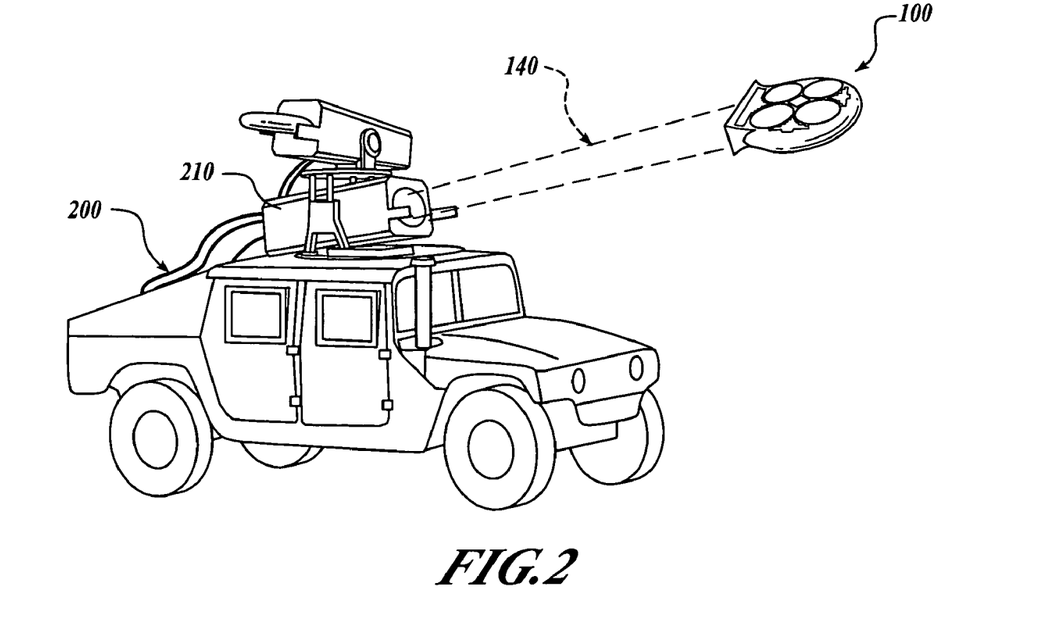
FIG. 2 is a side view of the device of FIG. 1.

FIG. 2 shows the device 100 receiving the electromagnetic beam 140 from a control station 200. In one exemplary embodiment, the control station 200 suitably is a ground-based vehicle, although the control station 200 could be a fixed, ground-based control station, an aerial control station such as a helicopter or other flying platform or a naval vehicle. The control station 200 includes a beam generator 210 for generating the electromagnetic beam 140. As previously described, the electromagnetic beam 140 suitably serves as a tether for the device. Thus, by steering the beam generator 210, operators of the control station 200 can position the device 100 in altitude and azimuth. As the positioning control system (not shown) of the device will strive to equalize the electrical power output of the photocells in the electromagnetic energy receiver 130 (FIG. 1), the device 100 will move to follow the projection of the electromagnetic energy beam. In one presently preferred embodiment, the beam generator 210 is a laser generator. The power output of the laser generator suitably is balanced to provide sufficient power for the device 100 (FIG. 1) without generating a destructive degree of power. Similarly, the wavelength and power of the laser generator are selected to avoid eye injuries from scattering of the electromagnetic beam 140 while, at the same time, providing a wavelength with efficient atmospheric penetration. Selection of the wavelength also should be made with respect to the photocells used in the electromagnetic energy receiver 130 so that the electromagnetic beam 140 will provide energy at a wavelength that can be efficiently converted by the photocells. Similarly, the photocells suitably are chosen for efficiency at a laser wavelength having good atmospheric penetration while reducing potential eye injury.

In one presently preferred embodiment, the laser generator is operable to generate a 1.064 μm-wavelength Nd:YAG laser. Other commercially-available compact, single mode high power lasers in the 100–300 W range are available in the 1.07 μm range, along with solar cells that operate at a high efficiency at this wavelength range. A laser at this frequency emits sufficient energy to provide a convertible energy source for the device 100. A laser operating at this wavelength has a transmission coefficient of about 70% at 1 km. Beam quality is also a consideration because, in one presently preferred embodiment, the electromagnetic beam not only serves as a power source but also as communications conduit and vehicle control system. A 1.064 μm wavelength represents a compromise between concerns of power output, conversion efficiency, atmospheric transmission, eye-safety, and beam quality.

A suitable atmospheric window exists at the 1.06–1.07 μm wavelength because the laser beam can penetrate earth's atmosphere with minimum attenuation. In one presently preferred embodiment, an estimated power budget for the device 100 is in the range of 8–10 watts. Therefore, the device can collect sufficient power from a 50–100 W watt laser at a distance of 1 to 2 km.

In one presently preferred embodiment, the beam generated by the beam generator 210 is expanded to minimize spread perpendicular to an axis of projection of the beam over a proposed range of operation. Minimizing spread is desirable to prevent wasted scattering of the energy projected by the beam generator 210 so as not to waste power as well as to allow the positioning control system (not shown) to be able to project a constant amount of power along the length of its virtual tether and also measure the length of the tether. An electromagnetic beam of roughly 10–15 cm in diameter is considered suitable. Using a 50 W laser, when the beam is expanded over a 10 cm circle, the incident power is 0.6 W/cm$^2$. A 10 cm diameter beam does not have substantially any beam divergence for a distance of 1–2 kilometers.

The electromagnetic energy beam 130 generated by the beam generator 210 also can be modulated to communicate additional control information to the device 100. If the positioning control system (not shown) is suitably equipped, modulated signals included in the electromagnetic beam 130 can be used to adjust how the device 100 responds to the electromagnetic energy beam 130. For example, this response can control surveillance devices (not shown) and telemetry, as well as other functions of the device. It will be appreciated that such control also could be transmitted using a separate modulated electromagnetic energy beam or RF signals.

Figure 3:
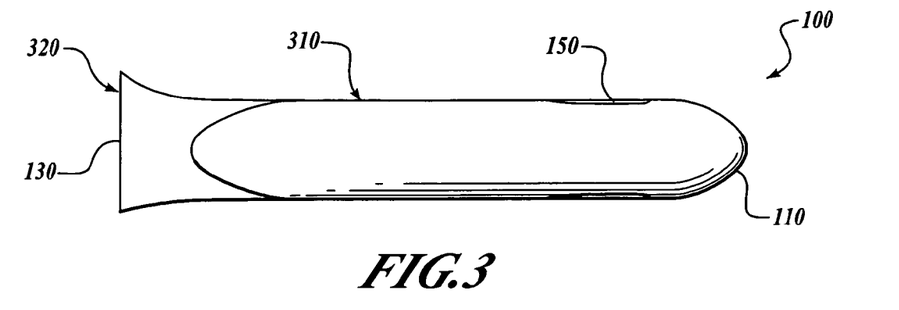
FIG. 3 is a perspective view of the device of FIG. 1.
Figure 4:
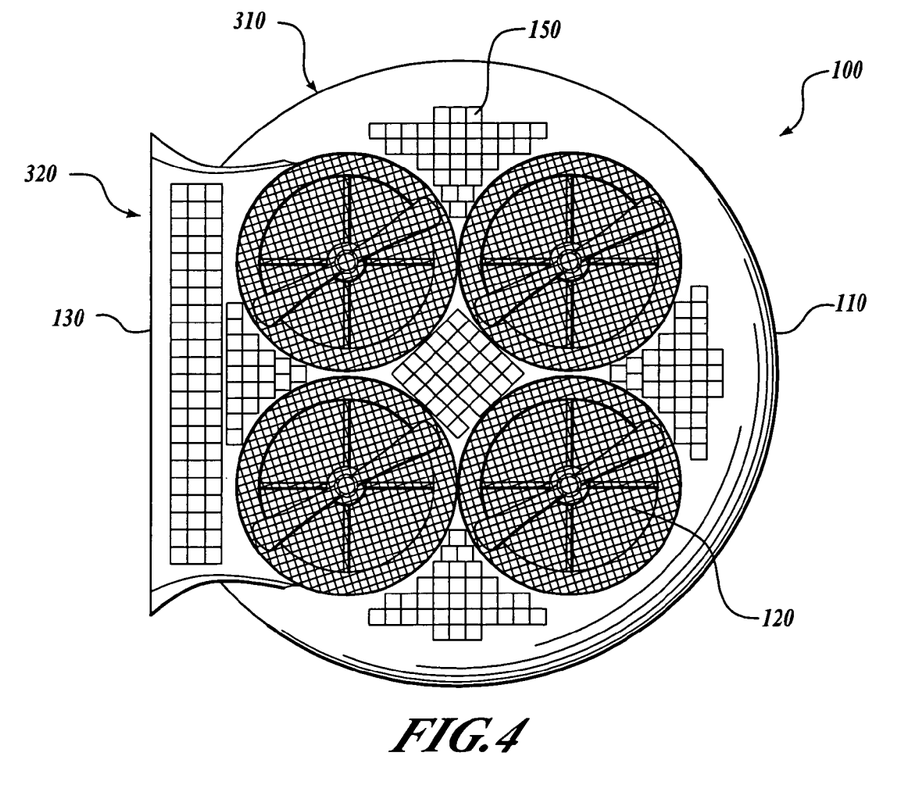
FIG. 4 is a perspective view of the device powered and controlled by a ground station.

Referring now to FIGS. 3 and 4, the housing 110 has generally curved sides 310 around most of the perimeter of the device 100. The curved sides 310 present a smaller drag profile to prevailing cross winds than do generally flat sides. However, in one presently preferred embodiment of the device 100, the housing includes at least one flat end 320 on which the electromagnetic energy receiver 130 is disposed. Disposing the electromagnetic energy receiver 130 on a flat surface simplifies the balancing of the energy received by the electromagnetic energy receiver 130. FIG. 3 also shows an edge of a photocell array 150. The photocell arrays 150 generally are positioned on an upper surface of the housing 110 of the device to capture sunlight which generally will reach the upper surface of the housing 110. The photocell arrays 150 are disposed on the housing 110 around and between the rotors 120. With this arrangement, the photocell arrays 150 make use of otherwise unused, available surface area on the housing 110 without obstructing operation of the rotors 120.

Figure 5:
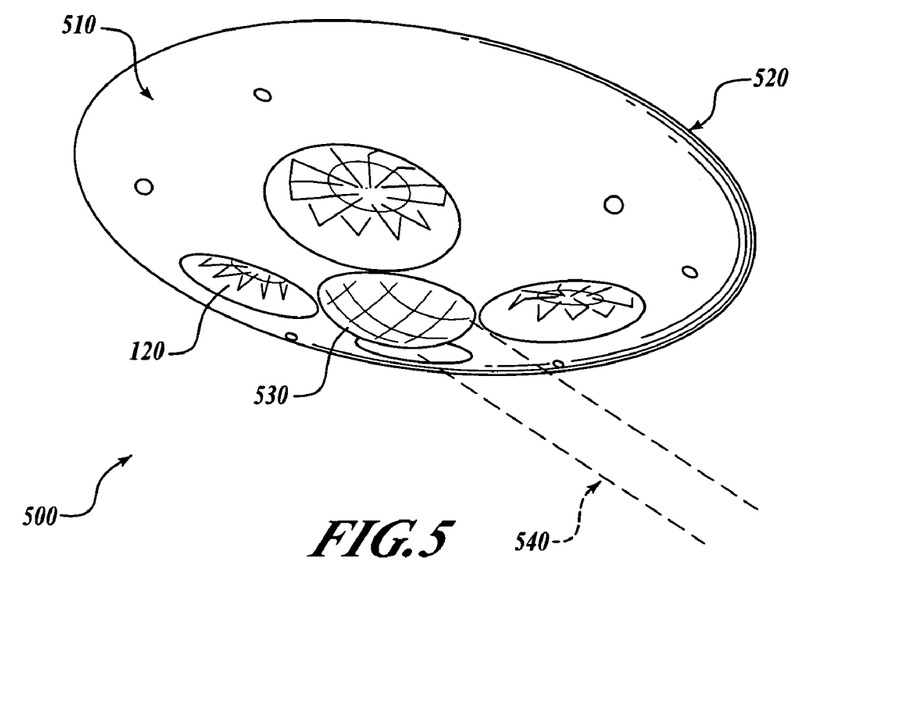
FIG. 5 is a laser-tethered airborne device according to another embodiment of the present invention.

FIG. 5 is another embodiment of the device 500. The device 500 includes a housing 510 that features rounded sides 520 around an entire perimeter of the housing 510, a plurality of rotors 120, and an electromagnetic energy receiver 530 mounted on a face of the housing 510 instead of on a side of the housing 510 as used in the first embodiment of the device 100 (FIGS. 1–4). When the device 500 is powered by an electromagnetic beam 540 projected from substantially below the device 500, the electromagnetic energy receiver 530 advantageously may be disposed on an lower face of the device 500. Similarly, when the device 500 is powered by an electromagnetic beam 540 projected from substantially above the device 500, the electromagnetic beam receiver 530 advantageously may be disposed on an upper face of the device 500. In either case, when the electromagnetic energy receiver 530 is disposed on a face of the device 500, the housing 510 of the device 500 advantageously can employ rounded sides 520 around an entire perimeter of the device 500 with aerodynamic benefits such as, for example, reduced drag to crosswinds on all sides.

Figure 6:
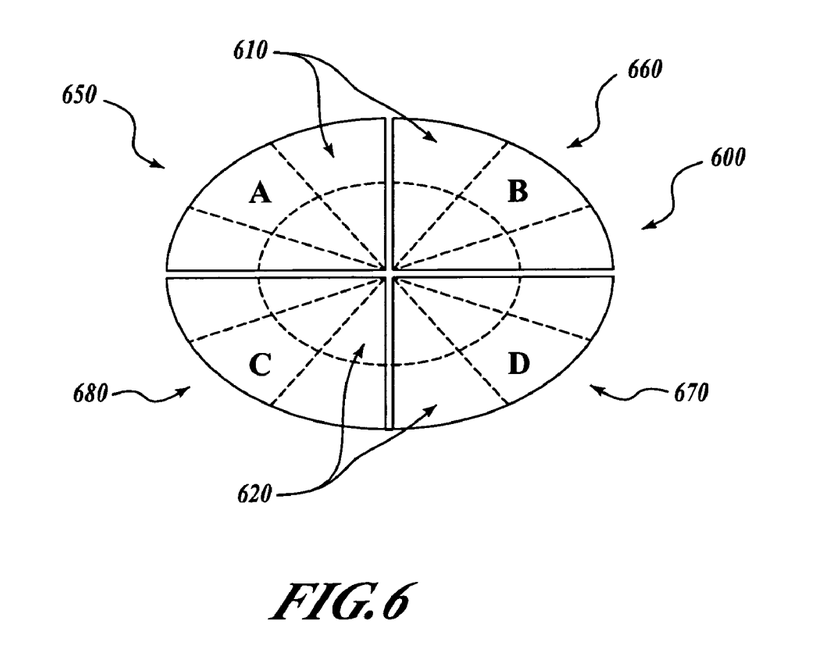
FIG. 6 is a zone diagram of a laser receiving array of the device.

FIG. 6 is a zone diagram of an electromagnetic energy receiver array 600. As previously described, energy received by the array 600 is used both to generate power for the device and to measure the position of the device. As previously discussed, the device can be programmed to tether itself to a projected position of the electromagnetic energy beam (not shown in FIG. 6) to remain aligned with the beam. It will be appreciated that "the device" suitably refers to the device 100 (FIGS. 1–4) and the device 500 (FIG. 5). To support such alignment, the array 600 suitably is divided into a plurality of angular zones 610 and radial zones 620. These zones provide carrier collection electrodes (grid) for efficient photoelectric power conversion. Both the angular zones 610 and radial zones 620 are also suitably are used to determine if the beam is moving relative to the array 600 either as the result of the movement of the beam or movement of the device. It will be appreciated that if the array included only angular zones 610, as position of the array 600 relative to the beam changed along a single angular direction, the array 600 would not indicate the relative movement until the beam moved off the array 600. Similarly, if the array included only radial zones 620, as position of the array 600 relative to the beam changed within a single radial zone 620, the array 600 would not indicate the relative movement until the beam moved off the array 600. Thus, using an array 600 divided into zones 610 and 620 provides outputs indicating relative movement between the beam and the array 600 so that the device can align itself to the electromagnetic energy beam.

In one exemplary embodiment, the electromagnetic energy receiver suitably is formatted into four quadrants, 650, 660, 670, and 680. Employing quadrants 650–680 is useful for controlling operation of the device 100, as will be further explained below.

Figure 7:
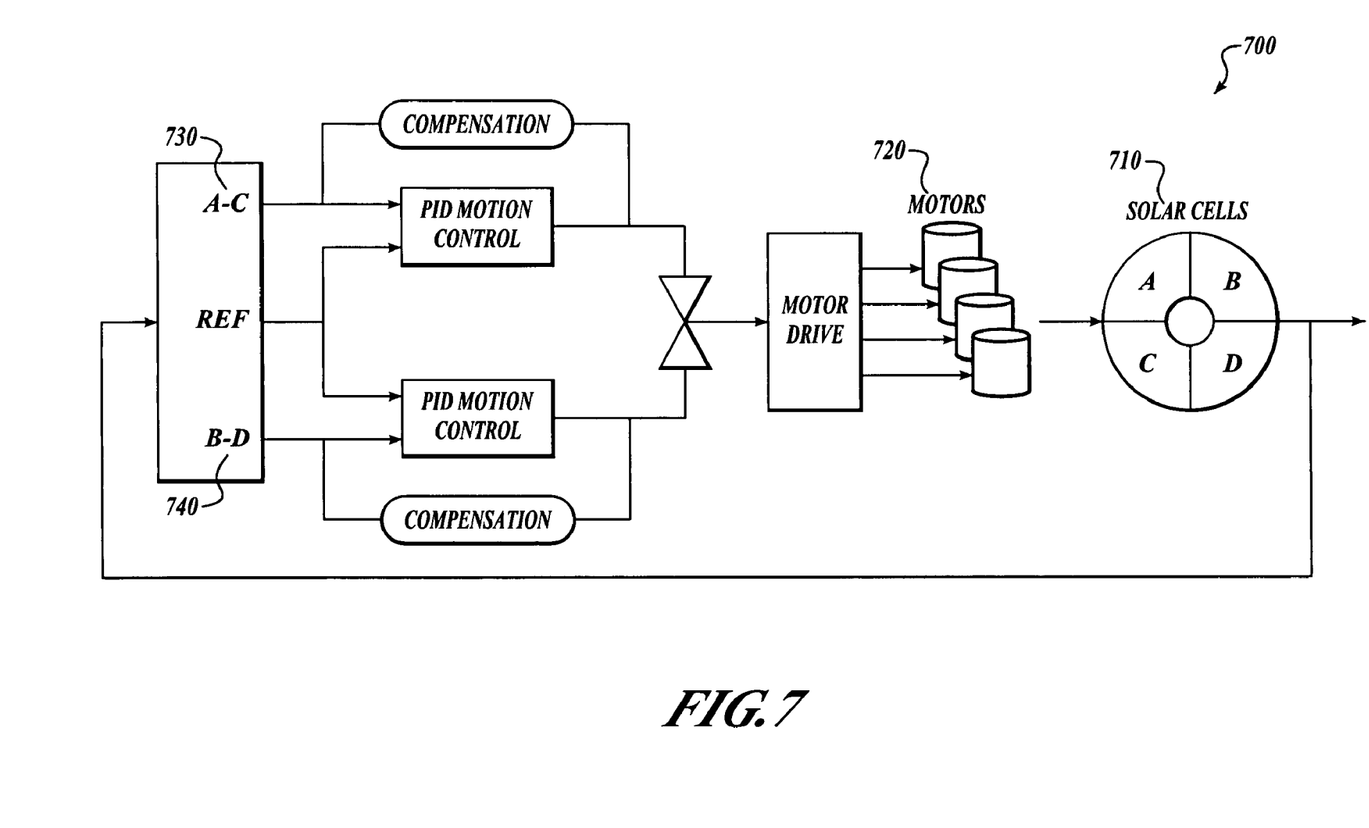
FIG. 7 is a block diagram of a laser receiving and control device used by an embodiment of the present invention.

FIG. 7 is a block diagram of a control system 700 used by the device 100 (FIG. 1) and the device 500 (FIG. 5), hereinafter referred to as "the device." To minimize power consumption and mass, while also providing optimal miniaturization, a control system using low-power application-specific integrated circuits is desirable, although the control system 700 can include off-the shelf components. The control system 700 is configured to generate flight control signals that maintain the device in alignment with the electromagnetic beam. Although a variety of control systems are useable with the device, one presently preferred embodiment of the present invention uses an analog servo loop control system with proportional-integration-differentiation (PID). The loop couples the electromagnetic energy receiver 710 with the motors 720 powering the rotors 120 (FIGS. 1–4). Center locking of the solar cell assembly to the laser beam is achieved when the difference of two cross-quadrant outputs 730 and 740 of the photocell array, for example the difference between quadrant 650 and quadrant 680 and quadrant 660 and quadrant 670 (FIG. 6) in each servo loop approaches zero. When the power of all quadrants is equal, the energy received from the four-quadrant solar cell reaches its maximum level, thereby signifying the device is centered on the electromagnetic beam tether. Accordingly, the control system 700 controls the pitch of the device relative to the ground and the roll of the device around an axis perpendicular to the plane of the electromagnetic energy receiver.

Figure 8:
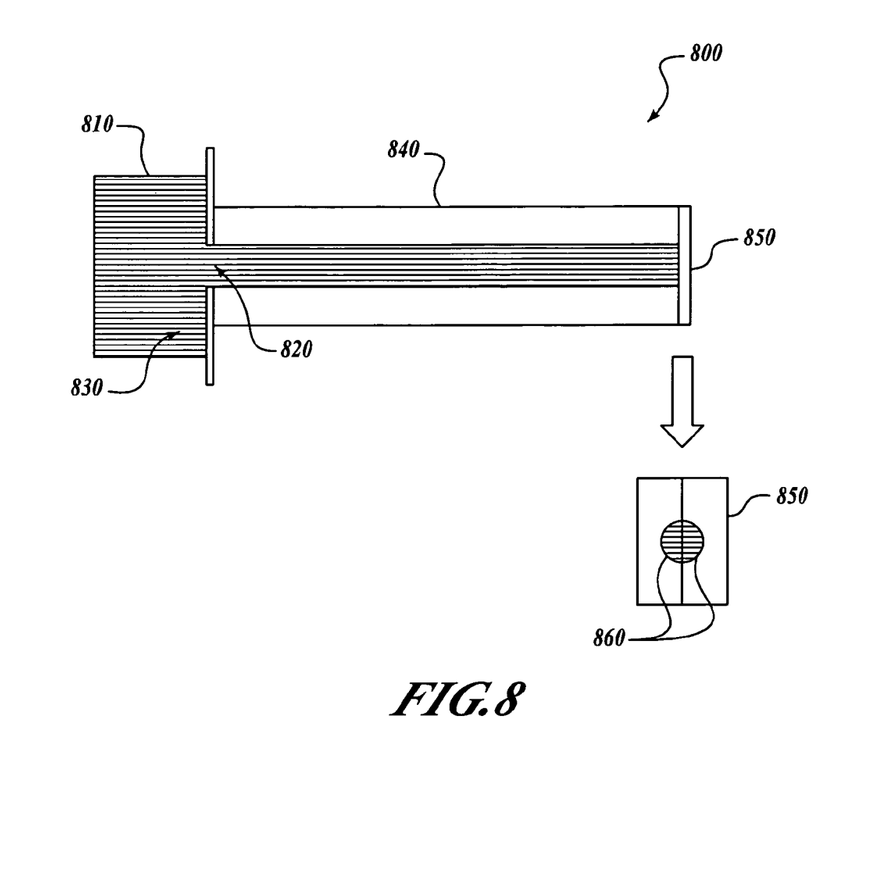
FIG. 8 is a yaw control device used by an embodiment of the present invention.

FIG. 8 is a yaw control device 800 used by the device 100 (FIGS. 1–4) and 500 (FIG. 5). Along with the control system 700 (FIG. 7) that adjusts the pitch and roll of the device around an axis generally defined by the electromagnetic energy beam 810, the yaw control device maintains the yaw of the device to keep the electromagnetic energy receiver facing the electromagnetic energy beam. In one presently preferred embodiment, the yaw control device 800 includes an aperture 820 at a center of the electromagnetic energy receiver 830. Behind the aperture 820 is a channel 840 leading toward a center of the device. At a distal end of the channel 840 opposite the aperture 820 is a segmented photodiode 850. When the yaw of the device is properly aligned so that the device faces the electromagnetic energy beam 810, energy from the electromagnetic energy beam 810 falls equally on both detector halves 860. Any change in the yaw of the device will increase energy received by one detector half 860 at the expense of energy received by the other detector half 860. The rotors 120 (FIG. 1) can be powered to realign the device to face into the electromagnetic energy beam 810. On the other hand, a lateral translation of the device can be distinguished from a yaw rotation because a lateral translation will change the energy received by both detector halves 860 equally, thus involving no yaw adjustment.

Figure 9:
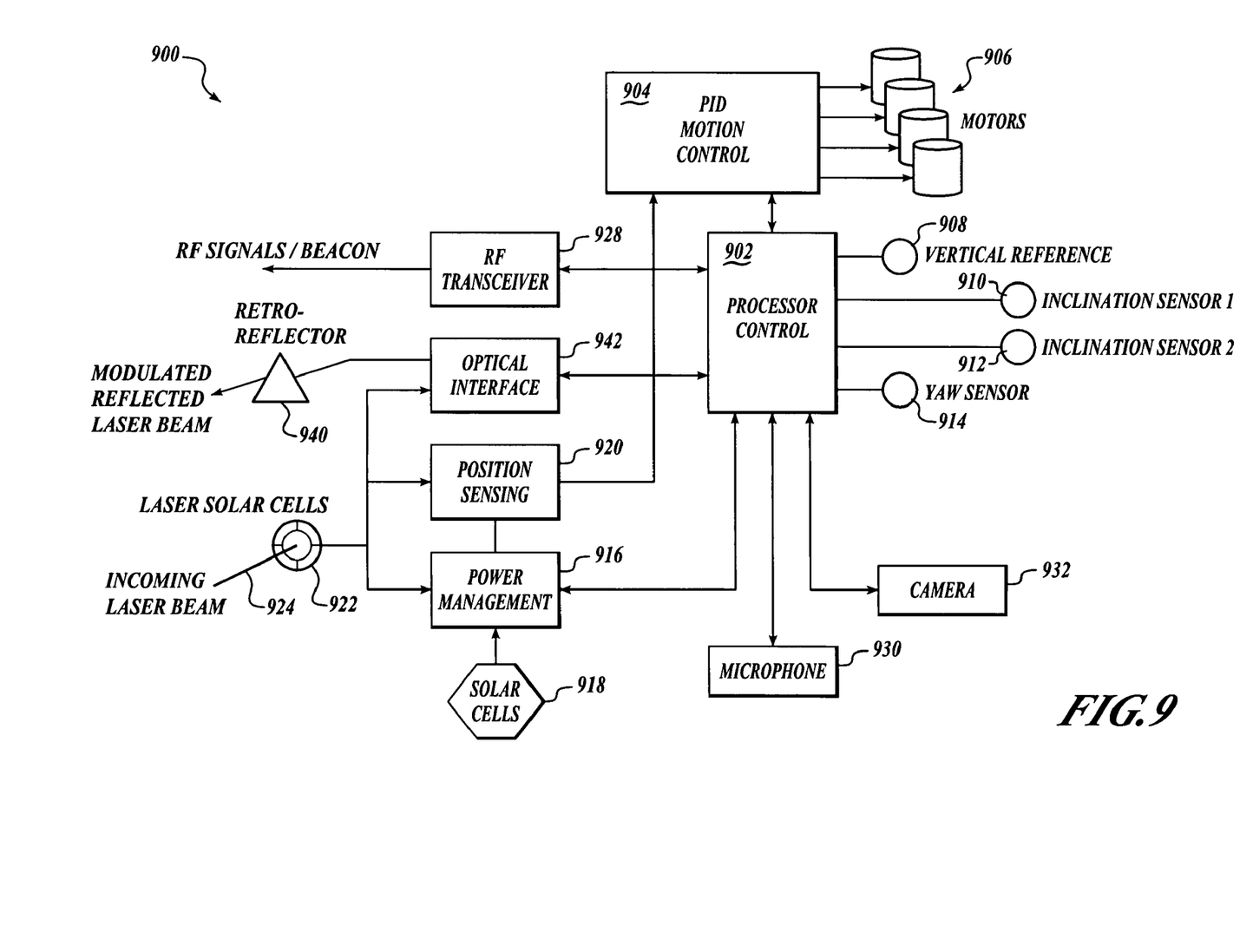
FIG. 9 is a block diagram of a control system used by an embodiment of the present invention.

FIG. 9 is a block diagram of a control system 900 used by an embodiment of the present invention. The control system 900 directs flight of the device 100 (FIGS. 1–4) and 500 (FIG. 5) and other supported functions such as control of surveillance devices and telemetry. The control system 900 includes a processor 902 which centrally directs flight and other operations according to preprogrammed instructions and received commands. The processor 902 interacts with the motion control system 904 which controls operation of rotor motors 906 as previously described in connection FIG. 7. The processor 902 also interfaces with a vertical reference sensor 908, inclination sensors 910 and 912, and a yaw sensor 914 (FIG. 8) to control. Using the sensors 908–914, the processor 902 can interact with the motion control system 904 to maintain the device in level flight at an appropriate altitude and orientation.

For controlling flight operations, the processor 902 also interacts with a power management controller 916 that monitors power received by the array 922 of photo cells acting as the electromagnetic beam receiver 130 (FIG. 1) receiving the electromagnetic beam 924 and the solar cells 918 (FIGS. 1, 3, and 4) configured to receive ambient radiation. The power management controller 916 provides input to the processor 902 regarding available power for flight operations. The processor 902 also interacts with a position sensing module 920 which receives position data from the receiver photocells 922 regarding the position of the electromagnetic beam 924 as previously described in connection with FIGS. 6, 7, and 9.

For responding to commands and controlling other supported functions, the processor also interacts with an RF transceiver 928 and surveillance devices such as a microphone 930, and a camera 932 operating inside or outside the spectrum of visible light. It will be appreciated that other detection devices, for non-limiting examples including of a chemical sensor, a biological sensor, a radiation detector, and an environmental sensor. Instead of a sensor, the processor 902 also suitably may direct a payload delivery system for transporting a payload object having a size and mass within operational capabilities of the remote-controlled vehicle.

In one presently preferred embodiment the transceiver is used as a location beacon which can aid the recovery of the device 100 in the event that the device link with its power source has been permanently severed. The power to this beacon transceiver will be provided by the solar cells on the top surface of the device and or any backup power reserves. The RF transceiver 928 suitably includes a multiple-band transceiver configured receive input and transmit output at the same time. The RF transceiver 928 is configured to transmit telemetry to control stations. The RF transceiver 928 also suitably is configured to transmit data captured by the microphone 930 and the camera 932. The RF transceiver 928 also is configured to receive commands from control stations to control onboard flight and support operations. For example, RF commands can be transmitted to the RF transceiver to direct the device to land, to enable or disable the microphone 930 and camera, or to indicate other directives. In one presently preferred embodiment, a low-power RF transceiver in the 902–928 MHz or 2.4 GHz frequency range is desirable, similar to the frequency range used in cordless telephones. In addition to or instead of the RF transceiver 928, the device also can receive commands through modulated laser signals 940 received via an optical interface 942. The optical interface 942 is coupled with the processor 902 allowing the processor to respond to directives received via the optical interface 940.

Figure 10A:
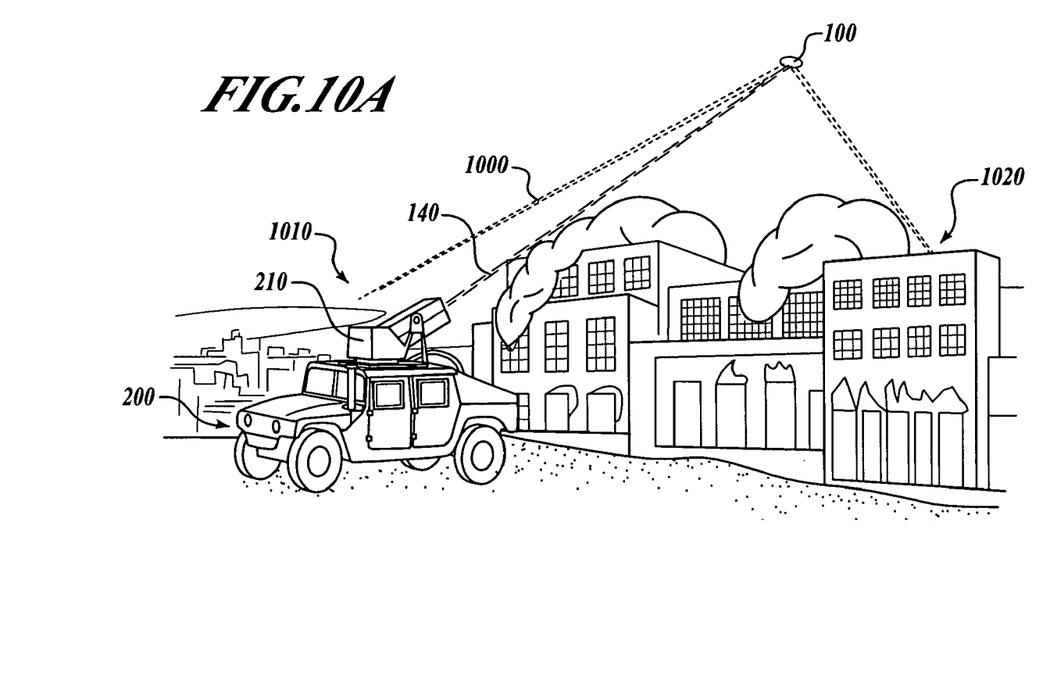
FIG. 10 is a diagram illustrating an embodiment of the present invention in which an airborne vehicle is tethered by an electromagnetic beam and is configured to relay an electromagnetic signal.
Figure 10B:
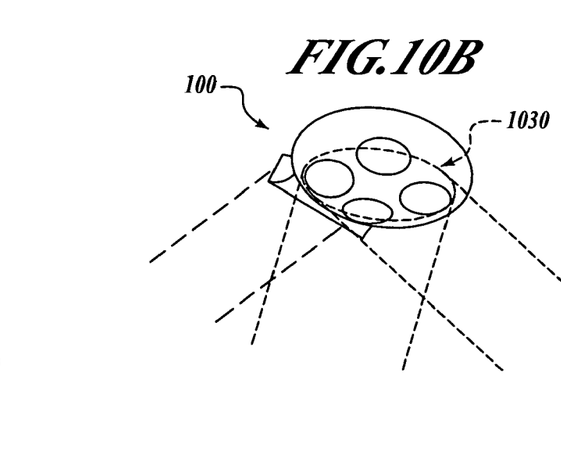

FIG. 10 is a diagram illustrating the device 100 tethered by an electromagnetic beam 140 and configured to relay an electromagnetic signal 1000. The device 100 is flown to a relay point where the device can relay an electromagnetic signal 1000 from a signal source 1010 to a signal destination 1010. The device 100, as previously described in connection with FIG. 2, receives power and direction from an electromagnetic beam 140 generated by a beam generator 210 associated with a control station 200. In this case, the control station 200 is a mobile vehicle capable of carrying and powering the beam generator 210. By directing the electromagnetic beam 140 and/or transmitting RF signals to the device, operators of the control station 200 can control the position of the device 100.

The signal source 1010 is not in a line-of-sight with the signal destination 1020. However, using the device 100, the signal 1000 can be redirected or relayed from the signal source 1010 to the signal destination 1020. The electromagnetic beam 140 can be directed to place the device 100 to a point from which it can redirect or relay the signal. To enable the device 100 to relay the signal 1000, a reflector 1030, such as a mirror, is mounted on an underside of the device

100. In addition to moving the device 100, the reflector 1030 suitably is mounted on a movable mount (not shown) adjustable by signals from the control station 200 via the electromagnetic beam 140 or RF signals.

The electromagnetic signal 1000 suitably is an electromagnetic communications signal, such as a modulated laser signal, generated by a communications transmitter (not shown) and to be received by a communications receiver (not shown). The relay device, instead of a reflector, could be a microwave relay or other communications relay suitable for relaying such a signal. Alternatively, the electromagnetic signal 1000 could be an electromagnetic weapon beam such as a high-powered laser. The electromagnetic weapon beam suitably is generated by a beam weapon (not shown) and directed toward a target (not shown).

Figure 11:
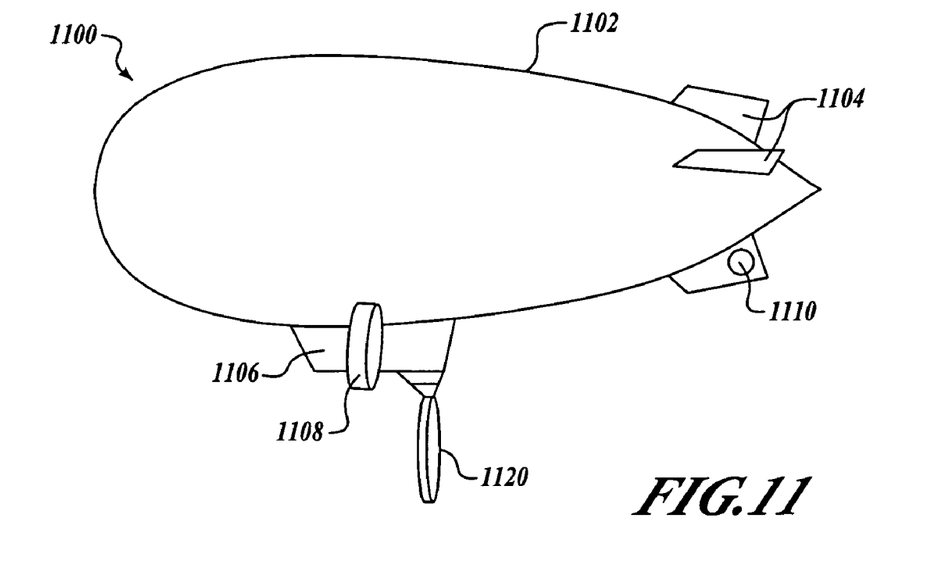
FIG. 11 is a side-elevational view of an alternative embodiment of the present invention used with a lighter-than-air vehicle.

FIG. 11 is a side-elevational view of an alternative embodiment of the present invention used with a lighter-than-air vehicle 1100. The device 1100 suitably includes a chamber 1102 such as a balloon, dirigible, blimp or other lighter-than-air device. Methods for generating lift with such devices is accomplished with gases having a lesser density than an ambient atmosphere, by heating ambient air, or by other methods known in the art. Coupled to the chamber are a number of fins 1104 which suitably include control surfaces for steering the device 1100 in pitch or yaw. Also coupled with the chamber 1102 is a control housing 1106. The control housing 1106 includes control devices suitable to receive and process the electromagnetic beam (not shown in FIG. 11) for controlling operation of the device 1100. The housing 1106 supports one or more thrust devices 1108. The thrust devices 1108 can be gimbaled to provide lift and/or thrust. The chamber 1102 provides lift as previously described, thus, the thrust devices 1108 are configured to provide supplemental lift to assist in holding payload aloft and/or for controlling vertical positioning of the device 1100. In addition, a steering thrust device 1110 may be included in the device 1100 to provide another control mechanism. Coupled to the device 1100 is an electromagnetic beam receiver 1120. The electromagnetic beam receiver 1120, as previously described, receives the electromagnetic beam for purposes of at least one of directing a position of the device 1100 and receiving power for operating systems onboard the device 1100.

Figure 12:
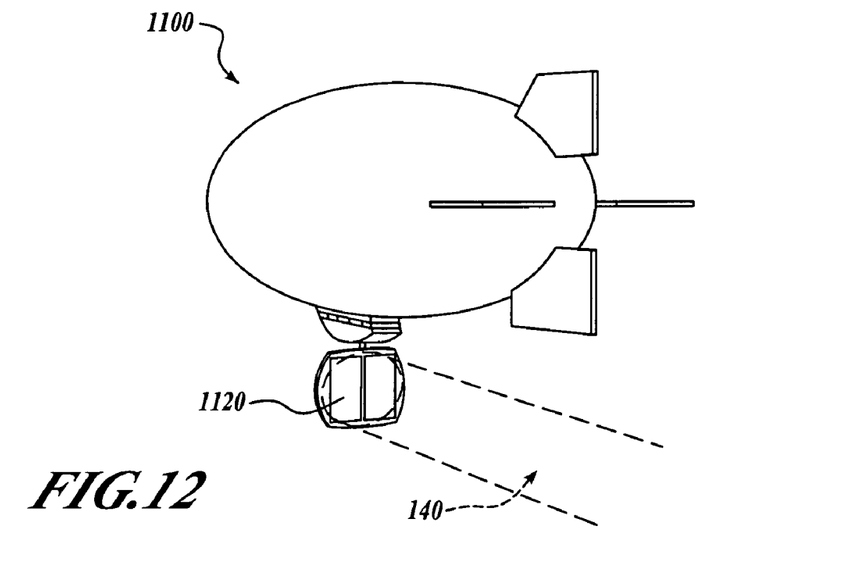
FIG. 12 is a perspective view of the vehicle of FIG. 11 being controlled by an electromagnetic beam.

FIG. 12 is a perspective view of the device 1100 of FIG. 11 being controlled by an electromagnetic beam 140. The electromagnetic beam 140 is directed to a location where the device 1100 is desired. As previously described, as the electromagnetic beam 140 is moved, the electromagnetic beam receiver 1120 generates a control signal representative of the position of the electromagnetic beam receiver 1120 is positioned relative to the electromagnetic beam 140. Responding to the control signal, a positioning system, housed in the housing 1106, directs the thrust device 1108 and, if included, the steering device 1110 and control surfaces associated with the fins 1104, to direct the device 1100 to track the location of the electromagnetic beam 140. By measuring signal strength or other means, the position of the device 1100 relative to the source (not shown) of the electromagnetic beam 140 can be controlled. By modulating and decoding pulses embedded in the electromagnetic signal 140, by transmitting RF commands, or other means, commands can be given to the device 1100 to further direct its operations.

Figure 13:
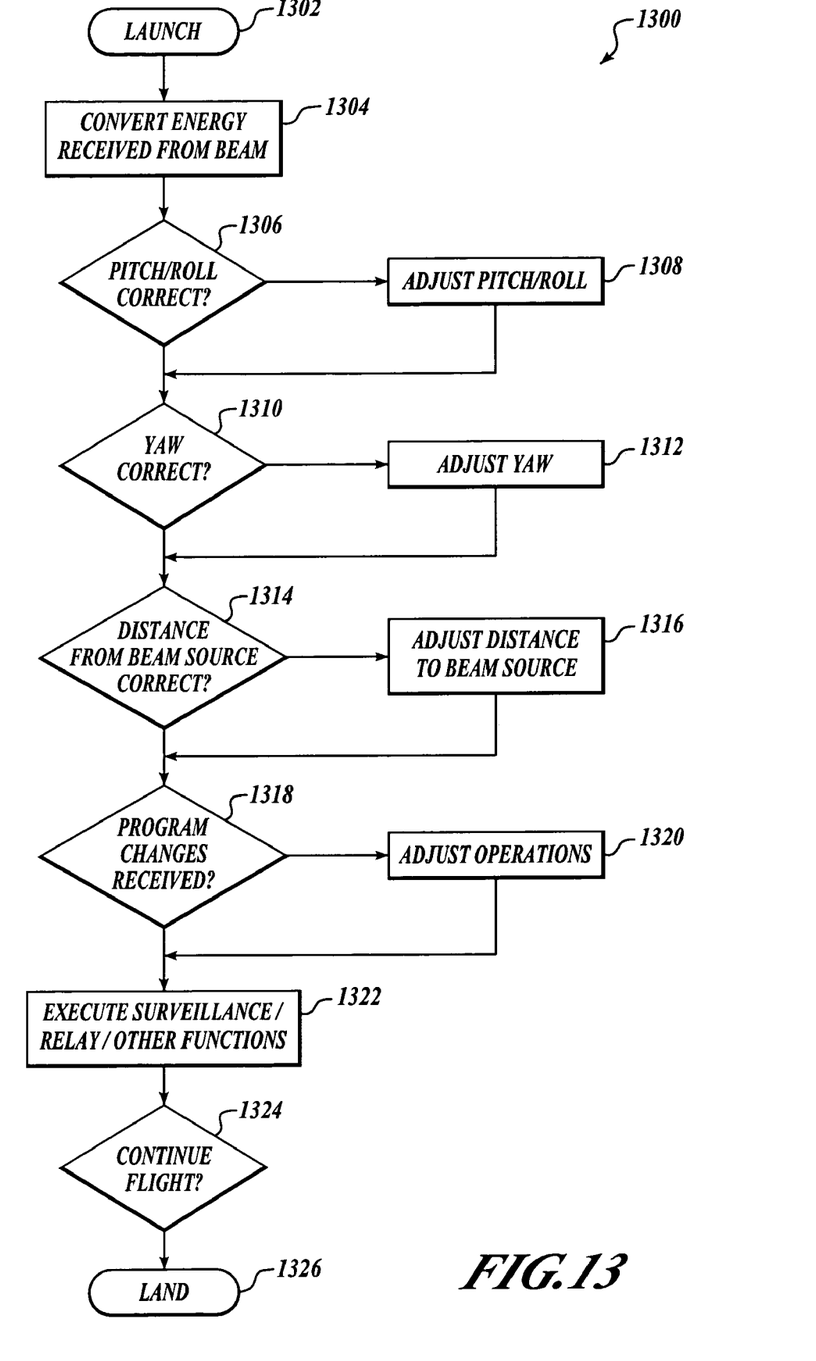
FIG. 13 is a flowchart of a routine for using an embodiment of the present invention.

FIG. 13 is a flowchart of a routine 1300 for using an embodiment of the present invention. The routine 1300 begins at a block 1302 with the launch of the device. At a block 1304, the device receives energy from an electromagnetic energy beam and converts it into electrical power to create lift to fly the device. Once in flight, at a decision block 1306 it is determined if the pitch and roll of the device are correct as described in connection with FIG. 7. If the pitch and roll are not correct, at a block 1308 the pitch and roll are adjusted. On the other hand, if the pitch and roll are correct, at a decision block 1310 it is determined if the yaw of the device is correct as described in connection with FIG. 8. If the yaw is not correct, at a block 1312 the yaw is adjusted. On the other hand, if the yaw is correct, at a decision block 1314 it is determined if the distance from the source is correct. In one presently preferred embodiment, the distance can be determined by a conventional ranging function by beaming a signal from a control station to the airborne device or vice versa and measuring the delay of the return signal. If the distance is not correct, at a block 1316 the distance is adjusted.

It will be appreciated that the principles used for controlling and/or providing power to the remote-controlled vehicle are equally applicable to other than airborne vehicles. To name a few non-limiting examples, the methods for controlling and powering a remote-controlled vehicle are workable with rolling or hovering land-based vehicles, space-based vehicles configured to operate in a partial vacuum, and submersible, floating, or hovering water-based vehicles as well.

If at the decision block 1314 the distance is determined to be correct, at a decision block 1318 it is determined if programming changes are being received. Such programming changes suitably include changes in distance from the control station. If it is determined at the decision block 1318 that programming changes are being received, the programming changes are implemented at a block 1320 where operations of the airborne device are adjusted.

On the other hand, if it is determined at the decision block 1318 that no programming changes are being received, at a block 1322 the device executes whatever support functions for which the device may be used. The device may be used for surveillance, relaying an electromagnetic signal, delivery of a payload, or another function.

At a decision block 1324 it is determined whether flight is to be continued. Flight might be terminated either by a landing signal being received or the airborne device losing its power source supplied by the external electromagnetic beam. If it is determined at the block 1324 that flight is to be continued, the routine 1300 continues at the block 1304 with the receipt and conversion of the energy beam. On the other hand, if it is determined at the block 1324 that the flight is being terminated, the routine 1300 ends at a block 1326 with the landing of the airborne device. It will be appreciated that all of these steps of the routine 1300 can be performed simultaneously or in a different order than shown in FIG. 13.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A control system for a remote-controlled vehicle, the system comprising:
   an electromagnetic energy receiver configured to receive an electromagnetic beam and further configured to generate a control signal indicative of a position of the remote-controlled vehicle relative to a position of the electromagnetic beam, wherein the electromagnetic energy receiver includes an electromagnetic receiving array having a plurality of electromagnetic sensors, each of the electromagnetic sensors being configured to generate a sensor output indicative of an intensity of electromagnetic energy received by the electromagnetic sensor;

a propulsion system; and a positioning control system configured to receive the control signal and maneuver the remote-controlled vehicle by directing the propulsion system in response the control signal, wherein the positioning control system is configured to orient the remote-controlled vehicle such that the electromagnetic energy receiver is directed to substantially continuously receive the incoming electromagnetic beam, and is further configured to approximately equalize the sensor output of each of the electromagnetic sensors by maneuvering the remote-controlled vehicle such that the electromagnetic beam is received at a predetermined portion of the electromagnetic receiving array.

2. The system of claim 1, wherein the electromagnetic energy receiver includes at least one photoelectric cell configured to generate electrical power when subjected to application of electromagnetic energy.

3. The system of claim 2, wherein the photoelectric cell includes a solar cell.

4. The system of claim 1, wherein the electromagnetic energy receiver is configured to receive an externally-applied laser signal.

5. The system of claim 1, wherein the control signal includes the sensor output of each of the electromagnetic sensors.

6. The system of claim 1, wherein the positioning control system is further configured to maneuver the remote-controlled vehicle relative to the source of the electromagnetic beam such that the remote-controlled vehicle maintains a predetermined distance from the source of the electromagnetic beam.

7. The system of claim 6, wherein the positioning control system is further configured to receive external commands for adjusting a response to the electromagnetic beam.

8. The system of claim 1, wherein the remote-controlled vehicle includes an airborne vehicle.

9. The system of claim 8, wherein the positioning control system is further configured to maintain the airborne vehicle at a level attitude.

10. The system of claim 8, further comprising a propulsion system including at least one rotor disposed to generate lift.

11. The system of claim 10, wherein the propulsion system includes a plurality of individually controllable lift rotors, each of the individually controllable lift rotors being further configured to generate a variable quantity of thrust such that a composite thrust of the plurality of individually controllable lift rotors provides at least one of a lift and a thrust component in a direction generally perpendicular to the lift.

12. The system of claim 8, wherein the propulsion system includes at least one rotor disposed to generate thrust in a direction generally perpendicular to the lift.

13. The system of claim 8, wherein the airborne vehicle includes a hovering vehicle configured to generate sufficient lift to support the airborne vehicle aloft.

14. The system of claim 8, wherein the airborne vehicle includes a lighter-than-air vehicle.

15. The system of claim 1, wherein the remote-controlled vehicle includes a land-based vehicle.

16. The system of claim 1, wherein the remote-controlled vehicle includes a water-based vehicle configured to operate at least one of on the surface or under the surface of a body of water.

17. The system of claim 1, wherein the remote-controlled vehicle includes a space-based vehicle configured to operate in at least a partial vacuum.

18. The system of claim 1, further comprising at least one surveillance device configured to capture data from the perspective of the remote-controlled vehicle.

19. The system of claim 18, wherein the surveillance device is configured to transmit telemetry to a telemetry station.

20. The system of claim 19, wherein the surveillance device is remotely controllable from a control station.

21. The system of claim 20, wherein the surveillance device includes at least one of a camera, a microphone, a chemical sensor, a biological sensor, a radiation detector, and an environmental sensor.

22. The system of claim 1, further comprising at least one relay device configured to relay an electromagnetic signal.

23. The system of claim 22, further comprising a movable base, wherein the movable base is configured to adjust a position of the relay device.

24. The system of claim 22, wherein the electromagnetic relay device includes a reflector configured to relay the electromagnetic signal.

25. The system of claim 24, wherein the relay device includes a mirror.

26. The system of claim 22, wherein the electromagnetic relay device includes a signal repeater configured to receive and resend an electromagnetic signal.

27. The system of claim 26, wherein the electromagnetic relay device includes a microwave relay.

28. The system of claim 22, wherein electromagnetic signal includes a communications signal.

29. The system of claim 22, wherein the electromagnetic signal includes an energy weapon beam.

30. The system of claim 29, wherein the energy weapon beam includes a high-powered laser signal.

31. The system of claim 1, further comprising a payload delivery mechanism.

32. A remote-controlled vehicle comprising:

a vehicle housing;

an electromagnetic energy receiver mounted on the vehicle housing, the electromagnetic energy receiver being configured to receive an electromagnetic beam and further configured to generate a control signal indicative of a position of the remote-controlled vehicle relative to a position of the electromagnetic beam, wherein the electromagnetic energy receiver includes an electromagnetic receiving array having a plurality of electromagnetic sensors, each of the electromagnetic sensors being configured to generate a sensor output indicative of an intensity of electromagnetic energy received by the electromagnetic sensor;

a propulsion system mounted on the vehicle housing; and a positioning control system configured to receive the control signal and maneuver the remote-controlled vehicle by directing the propulsion system in response the control signal, wherein the positioning control system is configured to orient the remote-controlled vehicle such that the electromagnetic energy receiver is directed to substantially continuously receive the incoming electromagnetic beam, and is further configured to approximately equalize the sensor output of each of the electromagnetic sensors by maneuvering the remote-controlled vehicle such that the electromagnetic beam is received at a predetermined portion of the electromagnetic receiving array.

33. The vehicle of claim 32, wherein the electromagnetic energy receiver includes at least one photoelectric cell configured to generate electrical power when subjected to application of electromagnetic energy.

34. The vehicle of claim 33, wherein the photoelectric cell includes a solar cell.

35. The vehicle of claim 32, wherein the electromagnetic energy receiver is configured to receive an externally-applied laser signal.

36. The vehicle of claim 32, wherein the control signal includes the sensor output of each of the electromagnetic sensors.

37. The vehicle of claim 32, wherein the positioning control system is further configured to maneuver the remote-controlled vehicle relative to the source of the electromagnetic beam such that the remote-controlled vehicle maintains a predetermined distance from the source of the electromagnetic beam.

38. The vehicle of claim 37, wherein the positioning control system is further configured to receive external commands for adjusting a response to the electromagnetic beam.

39. The vehicle of claim 32, wherein the remote-controlled vehicle includes an airborne vehicle.

40. The vehicle of claim 39, wherein the positioning control system is further configured to maintain the airborne vehicle at a level attitude.

41. The vehicle of claim 39, further comprising a propulsion system including at least one rotor disposed to generate lift.

42. The vehicle of claim 41, wherein the propulsion system includes a plurality of individually controllable lift rotors, each of the individually controllable lift rotors being further configured to generate a variable quantity of thrust such that a composite thrust of the plurality of individually controllable lift rotors provides at least one of a lift and a thrust component in a direction generally perpendicular to the lift.

43. The vehicle of claim 39, wherein the propulsion system includes at least one rotor disposed to generate thrust in a direction generally perpendicular to the lift.

44. The system of claim 39, wherein the airborne vehicle includes a hovering vehicle configured to generate sufficient lift to support the airborne vehicle aloft.

45. The system of claim 39, wherein the airborne vehicle includes a lighter-than-air vehicle.

46. The vehicle of claim 32, wherein the remote-controlled vehicle includes a land-based vehicle.

47. The vehicle of claim 32, wherein the remote-controlled vehicle includes a water-based vehicle configured to operate at least one of on the surface or under the surface of a body of water.

48. The vehicle of claim 32, wherein the remote-controlled vehicle includes a space-based vehicle configured to operate in at least a partial vacuum.

49. The vehicle of claim 32, further comprising at least one surveillance device configured to capture data from the perspective of the remote-controlled vehicle.

50. The vehicle of claim 49, wherein the surveillance device is configured to transmit telemetry to a telemetry station.

51. The vehicle of claim 50, wherein the surveillance device is remotely controllable from a control station.

52. The vehicle of claim 51, wherein the surveillance device includes at least one of a camera, a microphone, a chemical sensor, a biological sensor, a radiation detector, and an environmental sensor.

53. The vehicle of claim 32, further comprising at least one relay device configured to relay an electromagnetic signal.

54. The vehicle of claim 53, further comprising a movable base, wherein the movable base is configured to adjust a position of the relay device.

55. The vehicle of claim 53, wherein the electromagnetic relay device includes a reflector configured to relay the electromagnetic signal.

56. The vehicle of claim 54, wherein the relay device includes a mirror.

57. The vehicle of claim 53, wherein the electromagnetic relay device includes a signal repeater configured to receive and resend an electromagnetic signal.

58. The vehicle of claim 57, wherein the electromagnetic relay device includes a microwave relay.

59. The vehicle of claim 53, wherein electromagnetic signal includes a communications signal.

60. The vehicle of claim 53, wherein the electromagnetic signal includes an energy weapon beam.

61. The vehicle of claim 60, wherein the energy weapon beam includes a high-powered laser signal.

62. The vehicle of claim 32, further comprising a payload delivery mechanism.

63. A method for positioning a remote-controlled vehicle at a desired location, the method comprising:
  receiving an electromagnetic beam;
  detecting a position of the remote-controlled vehicle relative to a position of the electromagnetic beam with a plurality of electromagnetic sensors, each of the electromagnetic sensors being configured to generate a sensor output indicative of an intensity of electromagnetic energy received by the electromagnetic sensor; and
  maneuvering the remote-controlled vehicle to follow the electromagnetic beam to the desired location, wherein maneuvering the remote-controlled vehicle includes orienting the remote-controlled vehicle such that the electromagnetic energy receiver is directed to substantially continuously receive the incoming electromagnetic beam, and approximately equalizing the sensor output of each of the electromagnetic sensors such that the electromagnetic beam is received approximately equally by the electromagnetic sensors.

64. The method of claim 63, wherein the electromagnetic beam is received using at least one photoelectric cell configured to generate electrical power when subjected to application of electromagnetic energy.

65. The method of claim 64, wherein the photoelectric cell includes a solar cell.

66. The method of claim 65, wherein receiving the electromagnetic beam includes receiving an externally-applied laser signal.

67. The method of claim 63, wherein the remote-controlled vehicle is maneuvered to follow the electromagnetic beam using a plurality of electromagnetic sensors, each of the electromagnetic sensors generating a sensor output indicative of an intensity of electromagnetic energy received by the electromagnetic sensor from the electromagnetic beam.

68. The method of claim 63, further comprising maneuvering the remote-controlled vehicle relative to the source of the electromagnetic beam such that the remote-controlled vehicle maintains a predetermined distance from the source of the electromagnetic beam.

69. The method of claim 68, further comprising receiving external commands to adjust a response of the remote-controlled vehicle to the electromagnetic beam.

70. The method of claim 63, wherein the remote-controlled vehicle includes an airborne vehicle.

71. The method of claim 70, wherein the airborne vehicle includes a hovering vehicle configured to generate sufficient lift to support the airborne vehicle aloft.

72. The system of claim 70, wherein the airborne vehicle includes a lighter-than-air vehicle.

73. The method of claim 63, wherein the remote-controlled vehicle includes a land-based vehicle.

74. The method of claim 63, wherein the remote-controlled vehicle includes a water-based vehicle configured to operate at least one of on the surface and under the surface of a body of water.

75. The method of claim 63, wherein the remote-controlled vehicle includes a space-based vehicle configured to operate in at least a partial vacuum.

* * * * *